United States Patent [19]

Sechovec et al.

[11] Patent Number: 4,971,509

[45] Date of Patent: Nov. 20, 1990

[54] CARRIER FOR HANDICAPPED VEHICLES

[76] Inventors: Frank C. Sechovec, 812 29th St., West Des Moines, Iowa 50265; Roscoe W. McDaniel, P.O. Box 24421, Tempe, Ariz. 85282

[21] Appl. No.: 431,877

[22] Filed: Nov. 6, 1989

[51] Int. Cl.⁵ .............................................. B60R 9/06
[52] U.S. Cl. ............................ 414/462; 224/42.03 R; 224/42.08; 224/42.44; 280/402; 414/470; 414/483; 414/537; 414/921
[58] Field of Search ............... 414/462, 463, 469, 470, 414/537, 556, 571, 921; 280/402, 719; 224/310, 42.03 A, 42.03 B, 42.03 R, 42.07, 42.08, 42.43, 42.44

[56] References Cited

U.S. PATENT DOCUMENTS

| 3,720,333 | 3/1973 | Vaughn | 214/450 |
|---|---|---|---|
| 3,724,694 | 4/1973 | Wilson | 414/462 |
| 3,805,984 | 4/1974 | Schwarz et al. | 214/450 |
| 3,921,842 | 11/1975 | Campbell | 214/450 |
| 4,127,202 | 11/1978 | Jennings et al. | 414/537 |
| 4,189,274 | 2/1980 | Shaffer | 414/462 |
| 4,213,729 | 7/1980 | Cowles et al. | 414/462 |
| 4,234,284 | 11/1980 | Hauff | 414/462 |
| 4,313,618 | 2/1982 | Robinson | 280/719 X |
| 4,400,129 | 8/1983 | Eisenberg | 414/462 |
| 4,640,658 | 2/1987 | Webb, Jr. | 414/462 |
| 4,697,975 | 10/1987 | Lippold et al. | 224/42.03 R X |
| 4,705,448 | 11/1987 | Mungons | 414/462 |
| 4,763,914 | 8/1988 | Lemmons | 280/402 X |

Primary Examiner—Robert J. Spar
Assistant Examiner—Brian Dinicola
Attorney, Agent, or Firm—Zarley, McKee, Thomte, Voorhees & Sease

[57] ABSTRACT

A carrier for handicapped vehicle comprises a fulcrum frame which is adapted to be coupled rigidly to a trailer hitch mounted at the rear of an automobile, truck, or van. A horizontal platform is mounted on the fulcrum frame for tilting movement about a tilt axis provided by the fulcrum frame from a horizontal position to an inclined position wherein one edge engages the ground. The platform is also pivotal about a second axis perpendicular to the tilt axis and includes casters at its rear edge for engaging the ground and permitting articulation of the platform about the second axis.

8 Claims, 2 Drawing Sheets

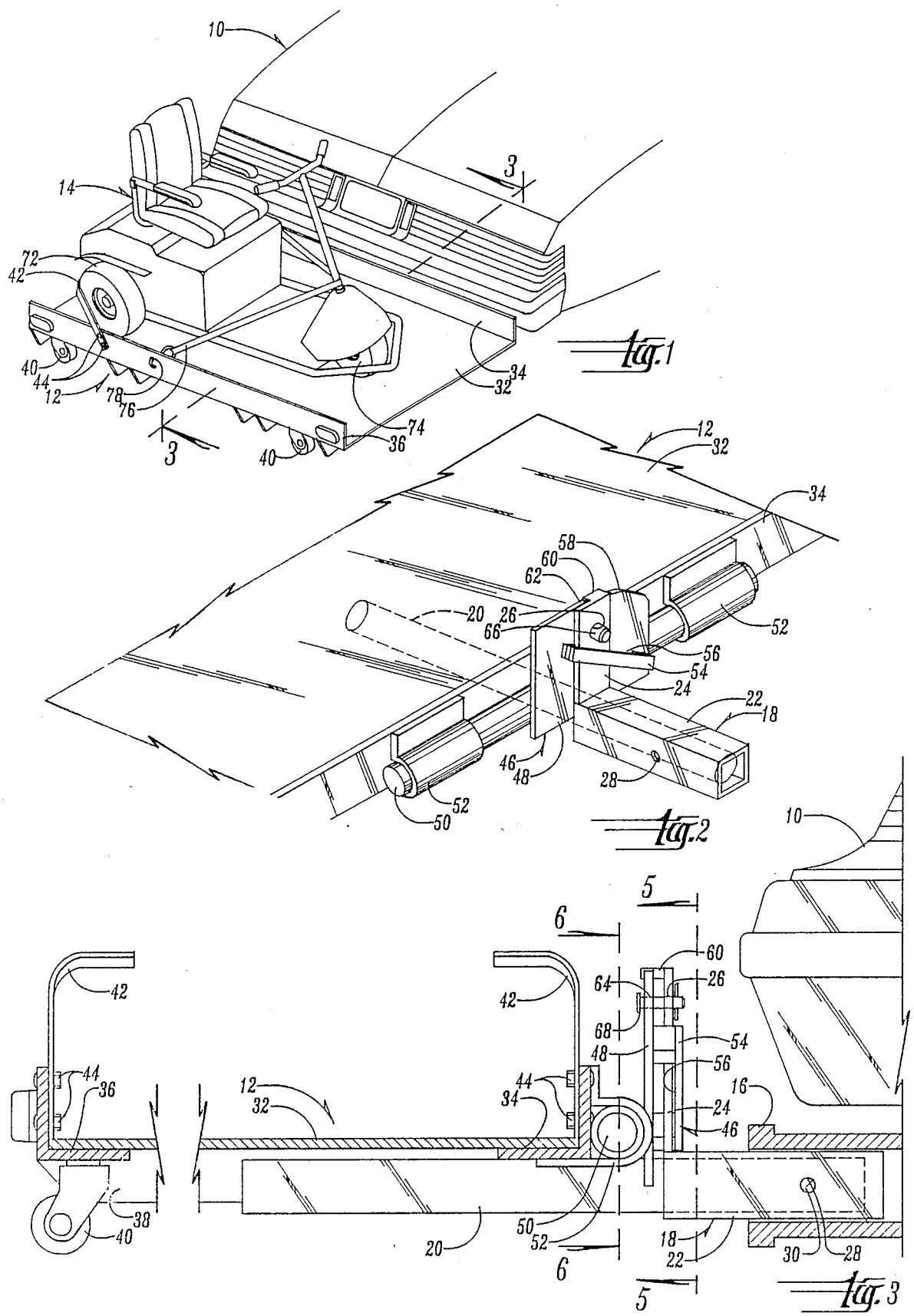

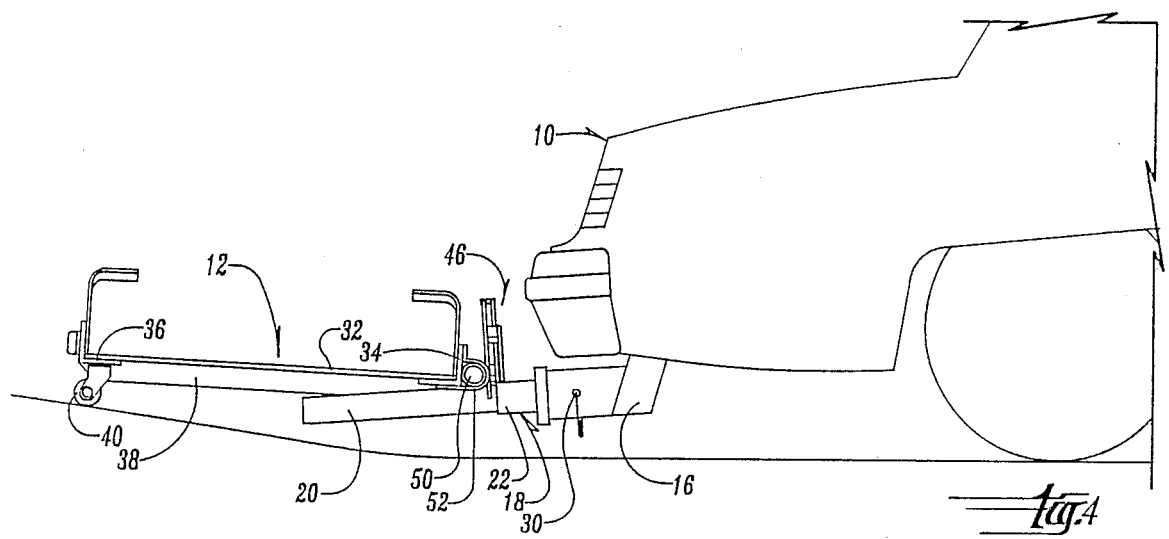
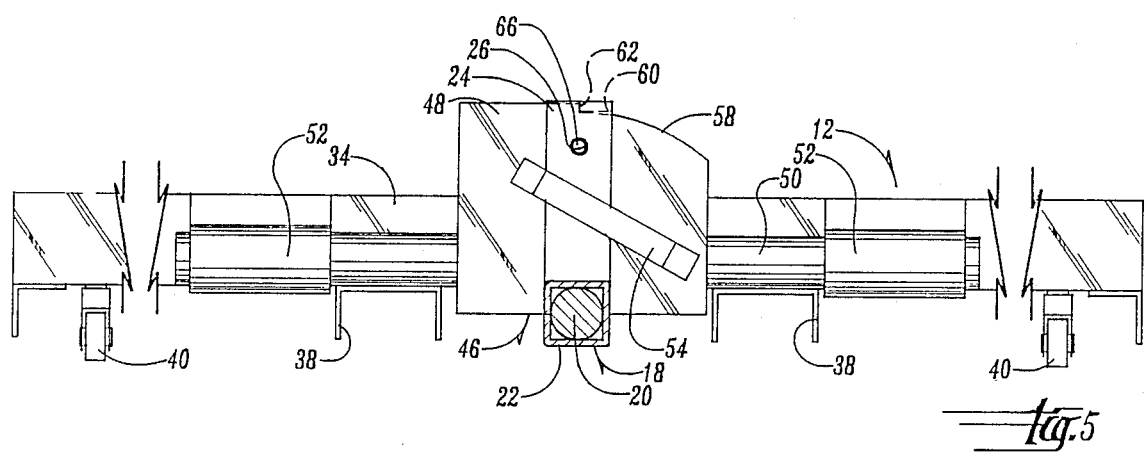
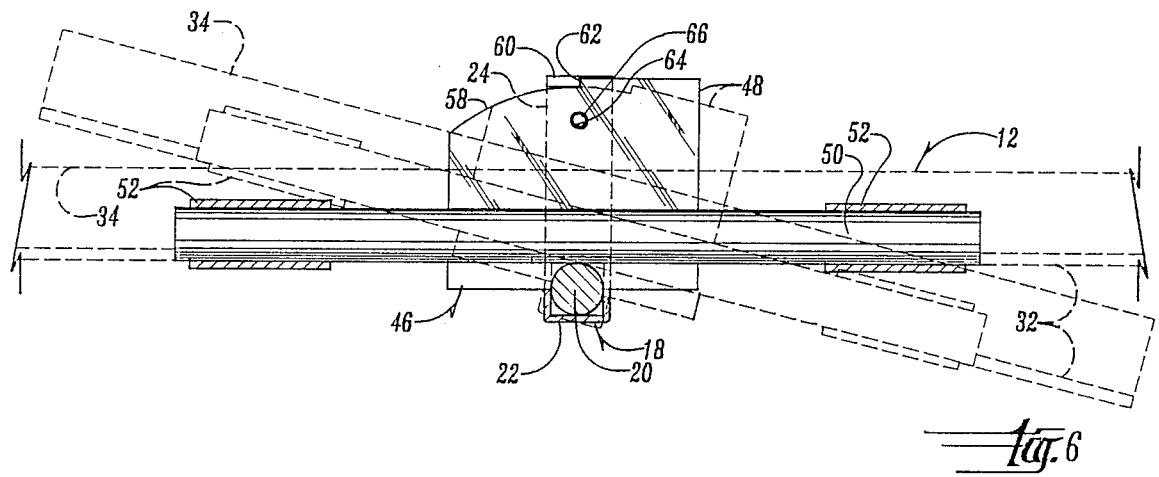

CARRIER FOR HANDICAPPED VEHICLES

BACKGROUND OF THE INVENTION

The present invention relates to a carrier for handicapped vehicles.

Numerous types of powered vehicles have been provided for handicapped persons. These vehicles have been provided for handicapped persons. These vehicles have contributed greatly to the independence and freedom of persons who are handicapped.

However, one problem encountered with these types of vehicles is the difficulty in transporting the vehicles to distant locations. Various means have been provided for storing the handicapped vehicles within the trunk of an automobile, or within vans or trucks. However, this method of transporting the handicapped vehicle is cumbersome and requires one or more persons to help the handicapped person in loading and unloading the handicapped vehicle from the automobile, van, or truck.

Various types of lifting equipment have also been utilized for lifting the handicapped vehicle into the automobile, van, or truck. However, this equipment is also cumbersome, and usually requires one or more persons to assist the handicapped person in loading the handicapped vehicle.

Therefore, a primary object of the present invention is the provision of an improved carrier for handicapped vehicles.

A further object of the present invention is the provision of a carrier for handicapped vehicles which can be loaded by the handicapped person without the assistance of other people.

A further object of the present invention is the provision of a carrier for handicapped vehicles which can be quickly and easily mounted to the trailer hitch of an automobile, truck, or van.

A further object of the present invention is the provision of a carrier for handicapped vehicles which will yield or articulate in response to encountering irregular undulations in the street, such as might be encountered when the automobile enters a driveway.

A further object of the present invention is the provision of a carrier for handicapped vehicles which is economical to manufacture, durable in use, and efficient in operation.

SUMMARY OF THE INVENTION

The present invention utilizes a fulcrum frame which is capable of being rigidly coupled to a conventional trailer hitch mounted at the rear of a vehicle. The fulcrum frame includes a fulcrum bar which extends rearwardly from the vehicle. Also, an radial member is rigidly connected to the fulcrum bar and extends radially outwardly therefrom.

A platform rests on the fulcrum bar, and a connecting assembly connects the platform to the fulcrum assembly so that the platform is free to tilt about the fulcrum provided by the fulcrum bar from a substantially horizontal position to an inclined position, wherein the platform engages the ground and permits the handicapped vehicle to be driven upwardly along the inclined surface provided by the platform.

The connecting assembly comprises a vertical plate which is in sliding facing engagement with the radial member of the fulcrum assembly. The vertical plate includes a guide member which forms a track in which the radial member of the fulcrum assembly fits. The vertical plate is welded or otherwise secured to a horizontal hinge bar which extends transversely to the fulcrum bar. The hinge bar is hinged to the platform so that the platform is free to pivot about a horizontal axis formed by the hinge bar.

The platform, the hinge bar, and the vertical plate are free to tilt about the fulcrum provided by fulcrum bar 20, with the radial member of the fulcrum assembly sliding within the slot provided by the guide member of the vertical plate. The retention of the radial member within the slot prevents axial movement of the platform relative to the fulcrum assembly, while at the same time permitting the platform to tilt about the tilt axis provided by the fulcrum member.

When the automobile to which the carrier is mounted encounters an irregular undulation in the paving (as for example might be encountered when the vehicle enters a driveway), a pair of caster wheels on the rear edge of the platform engage the supporting service and cause the platform to tilt about the horizontal axis provided by the hinge bar. This prevents damage to the rear of the platform when irregular supporting surfaces are encountered.

BRIEF DESCRIPTION OF THE DRAWINGS

FIG. 1 is a perspective view of an automobile having the carrier mounted thereon, and showing a handicapped vehicle mounted upon the carrier.

FIG. 2 is an enlarged detailed view of the connecting mechanism connecting the platform to the fulcrum assembly.

FIG. 3 is a sectional view of the carrier.

FIG. 4 is a side elevational view showing the operation of the device when the automobile encounters an irregular street surface.

FIG. 5 is a sectional view taken along line 5-5 of FIG. 3.

FIG. 6 is a sectional view taken along line 6-6 of FIG. 3.

DESCRIPTION OF THE PREFERRED EMBODIMENT

Referring to the drawings, the numeral 10 generally designates an automobile having a carrier 12 mounted thereon, the carrier 12 supporting the handicapped vehicle 14. Automobile 10 includes a conventional trailer hitch 16 which is of the square tube configuration.

Coupled to trailer hitch 16 is a fulcrum frame 18 comprising a fulcrum bar 20 having a circular cross section and a coupling tube 22 having a square cross section. Fulcrum bar 20 extends within coupling tube 22 and is rigidly secured therein by welding or the like. Extending upwardly from the coupling tube 22 is a radial member 24 which is perpendicular to the longitudinal axis of fulcrum bar 20. Extending through the upper end of radial member 24 is a locking hole 26. Extending horizontally through coupling member 22 is a coupling hole 28 for receiving a coupling pin 30 (FIGS. 3 and 4). When coupling tube 22 matingly fits within the square cross section of trailer hitch 16, and when locked therein by coupling pin 30, it is held rigidly against movement with respect to trailer hitch 16.

A platform 32 rests upon fulcrum bar 20 and includes a forward angle member 24 at its forward edge and a rear angle member 36 at its rear edge. A plurality of cross members 38 are provided beneath platform 32 to provide support and strength thereto. A pair of casters 40 are mounted adjacent the rear edge of platform 32 and extend outwardly therefrom. A pair of L-shaped wheel stops 42 are adjustably mounted to angle members 34, 36 by means of bolts 44. The angle members have a plurality of holes (not shown) therein which permit them to be adjusted to various positions so that they can accommodate different models and varieties of handicapped vehicles. Some handicapped vehicles have larger wheels than others, and the adjustability of the wheel stops 42 permit the carrier to be converted to accommodate these various types of models of handicapped vehicles.

Connecting the platform 32 to the fulcrum frame 18 is a connecting assembly 46 which comprises a vertical plate 48 having a hinge bar 50 welded thereto and extending in a direction perpendicular to the fulcrum bar 20. A pair of hinge collars 52 are rigidly connected to the forward angle member 34 of platform 32 and rotatably surround the hinge bar 50 so as to provide hinged movement of platform 32 about a horizontal axis provided by hinge bar 50.

Mounted to the forward surface of vertical plate 48 is a track member 54 which forms a slot 56 between plate 48 and track member 54. Extending within slot 56 is the radial member 24. The upper edge of vertical plate 48 is formed into a curved edge 58, and the radial member 24 includes a guide finger 60 which is adapted to slide along the curved edge 58. The fact that radial member 24 is held within track 56 permits the platform 32 to tilt about a tilt axis provided by fulcrum bar 20 from a horizontal position such as shown in FIG. 1 to an inclined position, wherein one of the sides of platform 32 engages the ground or supporting surface. The track member 54 and the plate 48 embrace the radial member 24 therebetween so as to prevent axial movement of the platform with respect to the fulcrum bar 20. A stop shoulder 62 (FIGS. 5 and 6) on vertical plate 48 is positioned to engage guide finger 60 when the platform returns from its inclined position to its horizontal position, and thereby insures that the platform will stop at its horizontal position.

A lock hole 64 is provided in plate 48 and is adapted to register with lock hole 26 and radial member 24 when the platform 32 is in its horizontal position. This permits a locking pin 66 to be inserted through the registered holes 26, 64 in the manner shown in FIGS. 2 and 3 so as to hold the platform in its horizontal position during movement of vehicle 10.

In operation, the handicapped vehicle 14 can be mounted upon platform 32 simply by removing pin 66 and permitting the platform to tilt from its horizontal position to its inclined position, wherein one edge of the platform engages the ground. Preferably the fulcrum bar 20 is located slightly off-center from the platform so that the platform will move by gravity to its inclined position when the pin 66 is removed.

The handicapped person then may drive the handicapped vehicle up the inclined surface of platform 32 until the weight of the handicapped vehicle 14 causes the platform 32 to automatically tilt to its horizontal position. The stop shoulder 62 prevents the platform from tilting beyond its horizontal position. Pin 66 is then inserted into the registered holes 26, 64, and the platform is secured in its horizontal position.

To secure the handicapped vehicle 14 in plate, L-shaped wheel stops 42 are positioned to engage rear wheels 72 of the handicapped vehicle 14. Forward wheel 74 may optimally be secured in place by means of securing straps 76 anchored in place by engagement with holes 78 in angle members 34, 36.

FIG. 4 illustrates the operation of the device when the automobile 10 encounters an irregular surface such as might be encountered when vehicle 10 enters a driveway. When this occurs, the rear casters 40 engage the supporting surface and cause the platform 32 to articulate with respect to the fulcrum bar 20, and with respect to the vertical plate 48, this articulation is permitted by virtue of the hinged arrangement between hinge bar 50 and hinge collars 52. When the automobile 10 encounters a level supporting surface again, the platform 32 pivots by gravity downwardly to its original horizontal position and is held in that position by virtue of fulcrum bar 20.

The device of the present invention is very simple to operate, and the vehicle 14 can be mounted and dismounted from the carrier by the handicapped person without help from other persons. Thus, it can be seen that the device accomplishes at least all its stated objectives.

We claim:

1. A carrier for a handicapped vehicle comprising:
   a first frame comprising an elongated fulcrum member having a forward end adapted to be rigidly connected to a trailer hitch and having a rear end, said first frame having an upstanding member rigidly connected to said fulcrum member and extending perpendicularly with respect to the longitudinal axis of said fulcrum member;
   a horizontal platform resting on said fulcrum member;
   first connecting means moveably connecting said platform to said first frame member for tilting movement about said fulcrum member with said fulcrum member providing a tilt axis for said platform, said platform being tiltable about said tilt axis from a substantially horizontal position to an inclined position;
   said first connecting means having an elongated slot formed therein surrounding said upstanding member so as to permit said tilting movement of said platform between said horizontal and said inclined positions while at the same time preventing movement of said platform in an axial direction with respect to said fulcrum member;
   lock means for selectively locking said connecting means to said upstanding member when said platform is in said horizontal position so as to prevent tilting movement of said platform about said tilt axis.

2. A carrier according to claim 1 wherein hinge means connect said platform to said connecting means for pivotal movement of said platform about a horizontal hinge axis transverse to said tilt axis, said platform having a forward edge and a rear edge, said hinge axis being located adjacent said forward edge of said platform.

3. A carrier according to claim 2 wherein caster wheels are mounted to said platform adjacent said rear edge thereof.

4. A carrier according to claim 1 wherein said connecting means comprises a vertical plate positioned in facing engagement with said upstanding member, a track member having opposite ends and a control portion, said opposite ends each being connected to said vertical plate and said central portion being spaced from said vertical plate so as to form said slot therebetween, said upstanding member of said first frame extending within said slot and being slidably embraced between said vertical plate and said central portion of said track member.

5. A carrier according to claim 2 wherein said connecting means comprises a vertical plate positioned in facing engagement with said upstanding member, a track member having opposite ends and a central portion, said opposite ends each being connected to said vertical plate and said central portion being spaced from said vertical plate so as to form said slot therebetween, said upstanding member of said first frame extending within said slot and being slidably embraced between said vertical plate and said central portion of said track member.

6. A carrier according to claim 5 wherein said hinge means comprises an elongated bar rigidly connected to said vertical plate and having a longitudinal bar axis extending perpendicular to said longitudinal axis of said fulcrum member, said hinge means further comprising at least one hinge collar rigidly connected to said platform and rotatably surrounding said bar whereby said bar axis provides said hinge axis and said platform, said bar, and said vertical plate tilt in unison about said tilt axis when said platform moves between said horizontal and said inclined positions.

7. A carrier according to claim 6 wherein said vertical plate and said upstanding member each have holes extending therethrough, said holes of said vertical plate and said upstanding member being registered when said platform is in said horizontal position, said lock means comprising a pin extending through said registered holes when said platform is in said horizontal position.

8. In combination:
- a powered vehicle having a vehicle frame, powered wheels engaging a supporting surface, a forward end and a rear end;
- a trailer hitch rigidly connected to said rear end of said vehicle;
- a carrier frame comprising an elongated fulcrum member having a forward end and a rear end, a coupling means fixed to said forward end of said fulcrum member, and an elongated radial member fixed to said fulcrum member and extending radially outwardly therefrom;
- said coupling member being detachably coupled to said trailer hitch and rigidly holding said carrier frame against movement with respect to said vehicle with said fulcrum member extending parallel to the direction of movement of said vehicle;
- a horizontal platform having a forward edge adjacent said radial member, a read edge, and a pair of opposite side edges, said platform resting on said fulcrum member;
- connecting means movably connecting said platform to said carrier frame for tilting movement about a tilt axis provided by said fulcrum member from a horizontal position to an inclined position wherein one of said opposite said edges of said platform engage said supporting surface;
- hinge means movably connecting said platform to said connecting means for hinged movement about a hinge axis adjacent said forward edge of said platform, said hinge axis being perpendicular to the longitudinal axis of said fulcrum member;
- caster wheels mounted to said platform adjacent said rear edge thereof for engaging irregular undulations in said supporting surface whereby said caster wheels will roll on said supporting surface and cause said platform to pivot about said hinge axis;
- a handicapped vehicle resting on said platform; and
- securing means detachably securing said handicapped vehicle to said platform.

* * * * *